United States Patent [19]

Carbaugh et al.

[11] Patent Number: 5,339,864
[45] Date of Patent: Aug. 23, 1994

[54] SAFETY SUB FOR RETAINING DRILLING FLUIDS

[75] Inventors: William L. Carbaugh, Humble; Douglas W. Carlson, Kingwood, both of Tex.

[73] Assignee: Hydril Company, Houston, Tex.

[21] Appl. No.: 94,513

[22] Filed: Jul. 20, 1993

[51] Int. Cl.$^5$ ............................................. F16K 15/14
[52] U.S. Cl. .................................... 137/844; 137/853; 251/5
[58] Field of Search .................... 251/5; 137/844, 853, 137/493

[56] References Cited

U.S. PATENT DOCUMENTS

| | | | |
|---|---|---|---|
| 3,342,215 | 9/1967 | Griffin | 251/5 X |
| 3,365,009 | 1/1968 | Burnham | 251/5 X |
| 3,955,594 | 5/1976 | Snow | 137/493 |
| 4,811,758 | 3/1989 | Piper | . |
| 5,205,325 | 4/1993 | Piper | 137/844 |

OTHER PUBLICATIONS

National–Oilwell PS & PS2-500/500 Power Swivel, "Kick" Down Hole Pressure Control, Document No. 05–05–00, Undated.
National–Oilwell PS 500/500 & PS2 500/500 Power Swivel, Internal Blowout Preventer (IBOP) Assembly, Document No. 10–40–03, Undated.

*Primary Examiner*—Robert G. Nilson
*Attorney, Agent, or Firm*—Vaden, Eickenroht, Thompson, Boulware & Feather

[57] ABSTRACT

A safety sub is disclosed for retaining drilling fluid in the kelly or equivalent and other components of the mud system located above the drill string when pressure drops in the drill string, such as when the circulation pump is turned off in adding a new joint to the drill string. The safety sub includes a pressurized elastomeric cartridge having three or more depressions surrounding a central bore. When internal drilling pressure drops, the external pre-charge pressure closes the elastomeric material by creating a cusp opposite each depression, the cusps closing together. The metallic end pieces of the cartridge and parallel round connecting rods between these inserts are bonded to the elastomeric material during the molding process. Thus, the cusps are precisely formed between the rod locations, resist tearing loose from the rods and the metallic end pieces even after many operations and the material becomes fatigued, and the end pieces do not translate longitudinally during the closing operation to further extend elastomer wear. Having at least three depression/cusp sections also causes the material to undergo less angle of buckling than with an elastomeric cartridge having only a twin buckling mode.

26 Claims, 3 Drawing Sheets

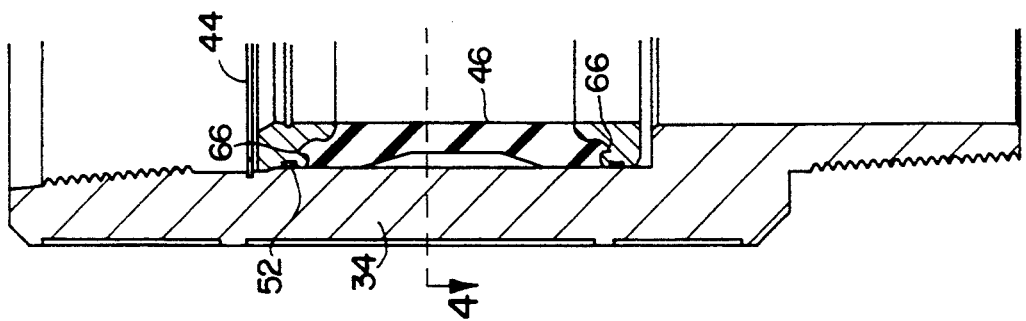
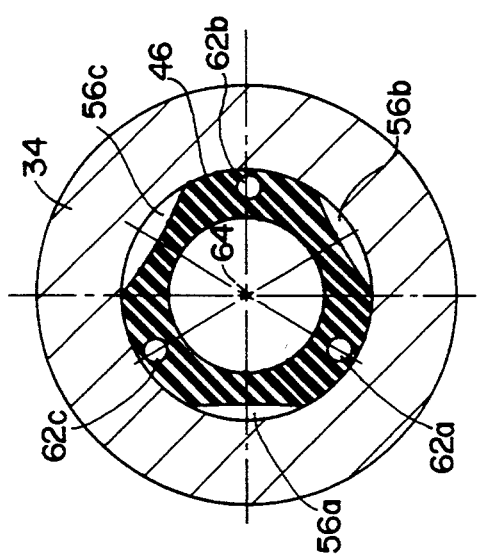
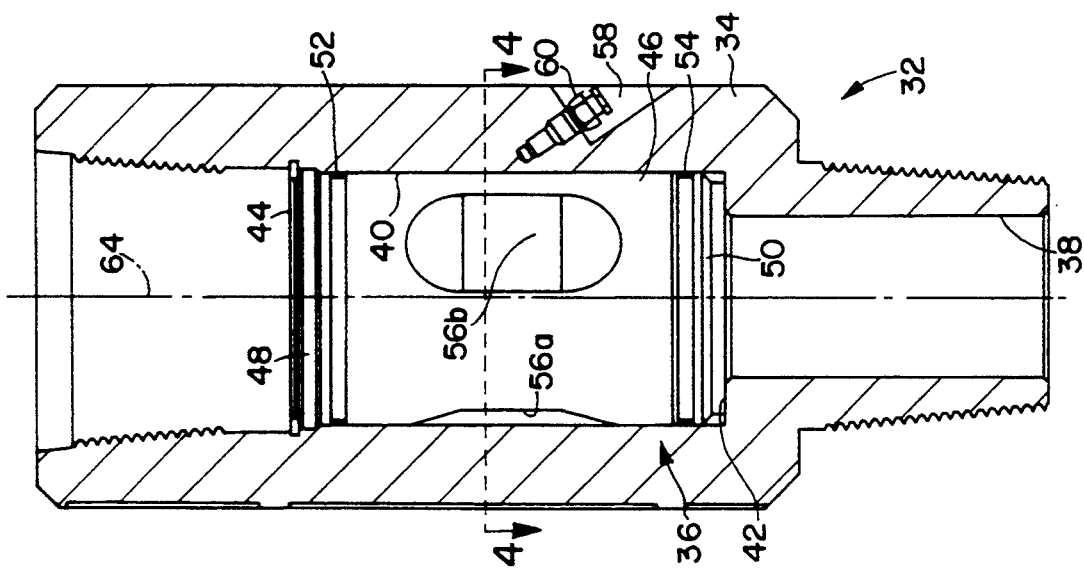

SAFETY SUB FOR RETAINING DRILLING FLUIDS

BACKGROUND OF THE INVENTION

1. Field of the Invention

This invention pertains to retaining drilling fluid within the mud system of a drilling operation when there is a reduction or loss of pressure in the part of the mud circulating in the drill string or when the drill string is separated to add a new joint of pipe and specifically pertains to preventing spilling such fluid from the portion of the mud circulation system remaining in the part of the pipe assembly disconnected from the drill string when there is an addition of a new pipe joint.

BACKGROUND OF THE INVENTION

A drilling operation of an oil or gas well generally involves a drill string with a drill bit attached to its lower end, a fluid system usually referred to as the "mud" system for lubricating the drill bit and for removing cutting debris from the well, and a drilling rig for supporting and rotating the drill string. The drill string is normally attached to the drilling rig component known as the "kelly", which is a longitudinal segment of drill stem that has a hexagonal or other discrete, multi-sided external surface for fitting into the central opening of the rotary table to allow the rotary table to rotate the kelly and, thus, the drill string attached and depending from it.

Each time that a new joint is added to the drill string, the drill string is separated from the kelly to allow the new connection to be made. The stand pipe from the mud system carries the drilling fluid to be circulated down through the drill string to a point above the kelly, which has been mentioned above is itself a rather long drill stem. When the connection is broken, the drilling fluid or mud in the kelly is dumped onto the drilling rig floor, thereby causing a messy condition for the workmen, a possibly dangerous and hazardous condition, and creating an environmental spill that fouls the area. This occurs even though the drilling fluid circulation system itself is shut off because there is a great deal of the drilling fluid remaining in the kelly even when circulation is interrupted.

A sub outfitted with a mud-retaining device is known to have been employed in the prior art between the kelly and the drill string to prevent this dumping from happening. One such device that is in the marketplace is manufactured by National Oil Well. This sub incorporates a rubber tube that collapses like a flattened hose to shut off mud flow. There is no internal supporting structure for the rubber tube, which fatigues rather rapidly and often fails to be satisfactory in retaining the drilling fluid even before failure of the hose because of the 180° bend of the tube. That is, when a thick rubber tube is folded back on itself there is an inherent opening at the bend that allows fluid to escape. Thus, an unsatisfactory amount of fluid escapes at either end of the flattened tube. In addition, the bends cause the rubber to be greatly stressed, eventually resulting in failure. Large chunks often tear or break off when this sub is used and fall from the disconnected sub or down hole through the drill string once circulation of drilling fluid is restarted.

Another device incorporating a pressurized check valve on a drill string has been patented by Torus Equipment of Oklahoma City, Okla. in U.S. Pat. No. 4,811,758. This device incorporates an elastomeric element that is pressurized from the outside, which pressure is overcome by internal drilling fluid pressure under normal drilling fluid conditions. When the drilling fluid pressure drops, such as preliminary to separating the drill string to add another joint, the external pressure on the elastomeric element causes some elastic action to occur, but mainly causes one end of the element to slide longitudinally to permit the element to close off the bore of the sub. The elastomeric element buckles from only one direction, as with the National Oil Well sub described above. Therefore, as the end moves up to allow the collapsing to take place, the elastomeric element closes in a manner that is determined by how the element naturally gathers or folds together. Repeated operations in this manner show that the elastomeric element is quickly fatigued, resulting in the same tearing apart problems associated with the National Oil Well sub.

Therefore, it is a feature of the present invention to provide an improved safety sub for retaining drilling fluids above the sub in the event of reduction or loss of drilling fluid pressure.

It is another feature of the present invention to provide an improved safety sub of the type described above wherein the pressurized elastomeric cartridge is externally pressurized at multiple, preferably three, external depressions, and closes in the same number of merging cusps.

It is yet another feature of the present invention to provide an improved safety sub of the type described above having a pressurized elastomeric cartridge that controllably and supportably collapses in an improved manner to minimize wear of the elastomeric element.

It is still another feature of the present invention to provide an improved safety sub of the type described above wherein the elastomeric substance of the cartridge is bonded to structural supporting rods to provide improved controlled closing response, to provide longer wearing parts by reducing stresses, and to provide minimizing of elastomeric substance tearing.

SUMMARY OF THE INVENTION

The safety sub for retaining drilling fluid in the external fluid supply above the drill string in the event of reduction or loss of normal operating fluid pressure in the drill string in accordance with the present invention includes an enlarged bore portion for retaining therein an externally pre-charged elastomeric cartridge, the charge being less than the normal operating fluid pressure of the drilling fluid internal to the drill string. The cartridge includes a molded elastomeric closure portion with a central bore connected to two metallic end pieces. The elastomeric substance of the closure is molded around and bonds to multiple supporting connecting rods parallel to the axis of the sub that are loosely connected to the metallic end pieces. The elastomeric substance also bonds to these metallic end pieces. The closure portion also includes multiple external depressions for accepting a pneumatic pre-charge via a charge valve in the sidewall of the sub opposite one of the depressions. O-rings in grooves of the metallic end inserts prevent leakage of the pre-charge, although there is leakage communication around the cartridge between the O-ring seals so that the pre-charge is applied to all of the multiple depressions. In the event of loss or reduction of internal drilling fluid pressure, the pre-charge on the elastomeric cartridge causes the closure portion to close in the same number of internal cusps as there are external depressions. The rods support the elastomeric substance or material and prevent longitudinal movement of the metallic end pieces. When there are three cusps, the buckling mode is three. Thus, the buckling of the material is only at a 120 angle, thereby achieving reduction in stress and fatigue of the material compared with a buckling mode of two. The connecting rods are preferably round in cross section to minimize the bonding stresses with the elastomeric material. The rods can be either metallic or non-metallic and may be somewhat flexible to allow controlled closing and opening of the central closure. The internal bore of the elastomeric cartridge can be cylindrical or hour-glass shaped. If hour-glass shaped, the flexing fatigue forces are somewhat improved even though the flow-through characteristics may be slightly turbulent.

BRIEF DESCRIPTION OF THE DRAWINGS

So that the manner in which the above recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the drawings illustrate only preferred embodiments of the invention and are therefore not to be considered limiting of its scope as the invention may admit to other equally effective embodiments.

In the drawings:

FIG. 3 is a longitudinal cross-sectional view of the drill stem sub portion of the safety sub in accordance with a preferred embodiment of the invention, showing the elastomeric cross-section in open view.

FIG. 4 is a lateral cross-sectional view taken at line 4—4 shown in FIG. 3.

FIG. 5 is a longitudinal cross-sectional view of a portion of the entire safety sub shown in FIG. 3.

DESCRIPTION OF THE PREFERRED EMBODIMENTS

Figures 1, 2:
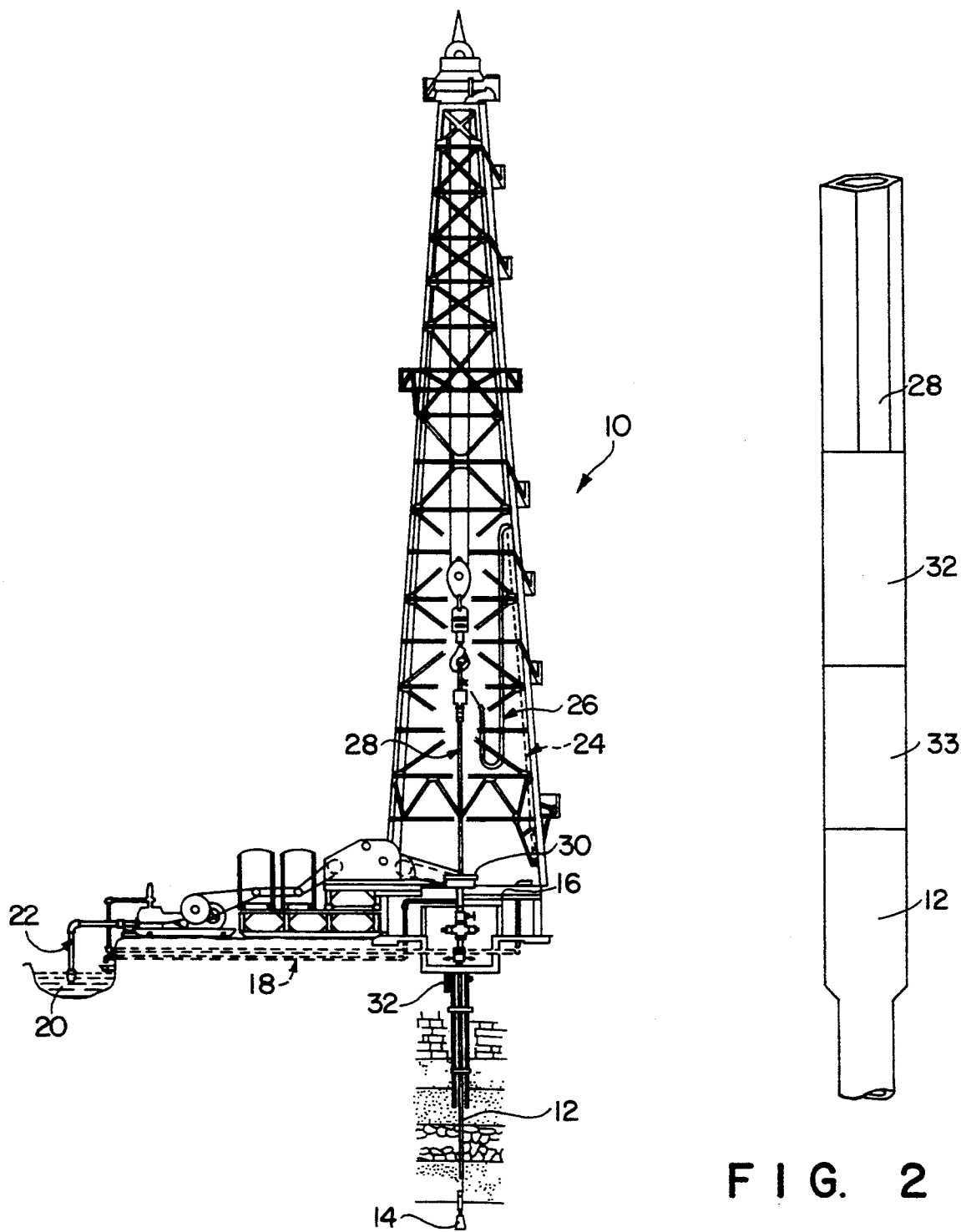
FIG. 1 is a plan view of a typical drilling installation in which a safety sub in accordance with the present invention can be used.
FIG. 2 is a fragmentary side view of a portion of a rotating drill string in a rotary drilling rig illustrating the location of the safety sub in accordance with the present invention.

Now referring to the drawings, and first to FIG. 1, a typical drilling rig 10 is shown. The important operating components for understanding the operation of the present invention include drill pipe or drill string 12, which is made up of multiple joints of pipe connected end to end, the length of each joint typically being about 30 feet. The drill string supports bit 14 at its lower end and is hollow so that drilling fluid can be circulated down through the drill string to lubricate the cutting surfaces of the bit and to provide flushing or removal of cuttings and other debris up the annulus around the pipe. The effluent from the annulus is through flow nipple 16 to mud circulation system 18.

A reservoir 20 of the drilling fluid permits settling of the foreign matter from the fluid and treatment of the fluid with suitable additives. A suction pipe 22 leading from the reservoir permits suitable pumping of the fluid up through stand pipe 24 and rotary hose 26 to a location above the kelly or drill stem 28, an elongated hexagonal or octagonal pipe that leads down through the central opening in rotary table 30. Rotary table 30 closes on the kelly and is rotated to produce the turning or rotating forces on the drill string to cause drilling. A safety sub 32 in accordance with the present invention is included in the drill string between the upper joint of drill pipe and the kelly. In order to add a new joint of pipe to the string, the circulation system is stopped, the string is raised so that the lower end of the kelly and the safety sub to be described more fully hereinafter are positioned just above the rotary table to permit disconnection of the string from the safety sub. As soon as the pressure of the drilling fluid is reduced below a predetermined amount as determined by the counter or opposing pre-charge amount applied to the safety sub, approximately 450 psi, the safety sub closes to prevent the fluid present in the kelly and the rotary hose and other components of the fluid circulation system located above the drill string from spilling or dumping out and not only making an environmental mess, but causing an unpleasant, slippery, possibly hazardous, and wasteful condition.

Once the new joint has been added to the drill string and circulation of the fluid restores the internal fluid pressure to operating conditions, the safety sub opens until the next time that fluid pressure in the drill string again is reduced.

Now referring to FIG. 2, a closer view of the operation just described is illustrated. The bottom of kelly 28 is connected to the top end of safety sub 32. A manually controlled drill stem ball valve sub 33 or the strippable kelly cock is connected to the lower end of sub 32 for positively shutting off the fluid when there is a requirement to have independent control of this function and not merely rely on the automatic shut-off associated with the safety sub alone. Finally, the ball valve sub is connected into the box end of the upper drill pipe of drill string 12. In any particular rig, there may be additional subs or a variation from what has been shown.

It is noted that the drilling rig illustrated in FIG. 1 is a rotary drilling rig that includes a kelly and a rotary table. Many drilling rigs do not include these components. Instead, such rigs include a so-called top drive power swivel. The safety sub described herein can be employed in such a rig by being connected directly to the power swivel in the same manner as it is connected to the kelly in FIG. 1.

Safety sub 32 shown in FIG. 3 includes an outer drill stem sub section 34 and an internal elastomeric cartridge 36. Sub section 34 is externally threaded at its lower end for connection to the top joint of the drill string and includes a central bore 38, which is sized to be consistent or approximately the same as the central bore of the drill string. Central bore 40 in the middle of sub section 34 is enlarged with respect to bore 38, thereby forming an internal lip or ledge 42 for limiting the downward movement of cartridge 36. An internal groove in central bore 40 receives a snap ring 44 for retaining cartridge 36 in central bore 40. At the upper end of sub section 34, the bore is internally threaded for connection to the kelly, as previously described.

As will be explained more in detail below, elastomeric cartridge is comprised of a molded central closure section 46, an upper metallic end piece 48 and a lower metallic end piece 50. These metallic end pieces are each peripherally grooved to receive an O-ring 52 and 54, respectively, for sealing against the inside surface of central bore 40.

The molded central closure portion 46 of cartridge 36 includes three external depressions at evenly spaced positions around the periphery of closure portion 46. Depressions 56a and 56b are shown in FIG. 3 with the third depression, depression 56c being shown from the top sectional view illustrated in FIG. 4.

The sidewall of sub section 34 includes an external recess 58 for receiving in a fixed location, such as by a threaded connection, charge valve 60. The recess is deep enough so that no part of the valve is beyond the external surface of sub section 34. The valve is positioned at a convenient access angle to the longitudinal axis of the sub section and its exit end is open to central bore 40, preferably opposite one of depressions 56a, 56b, and 56c. In FIG. 3, for convenience of illustration, valve 60 is shown slightly offset from depression 56b. Before being put into operation, the external surface of the elastomeric cartridge is pre-charged to an amount sufficient to cause the cartridge to seal off the bore without the circulation pressure having been cut off. Ordinarily, this pre-charge is about 450 psi. It is convenient to use an inert gas such as nitrogen for pre-charging or pressurizing the safety sub, although clean air can be used, if desired. A valve suitable for performing in the manner described is a Schrader loading valve or its equivalent. Enough leakage communication exists around central closure 46 between O-ring seals 52 and 54 that there is equal inwardly directed radial pressure applied at each depression 56a, 56b and 56c.

Figure 5A:
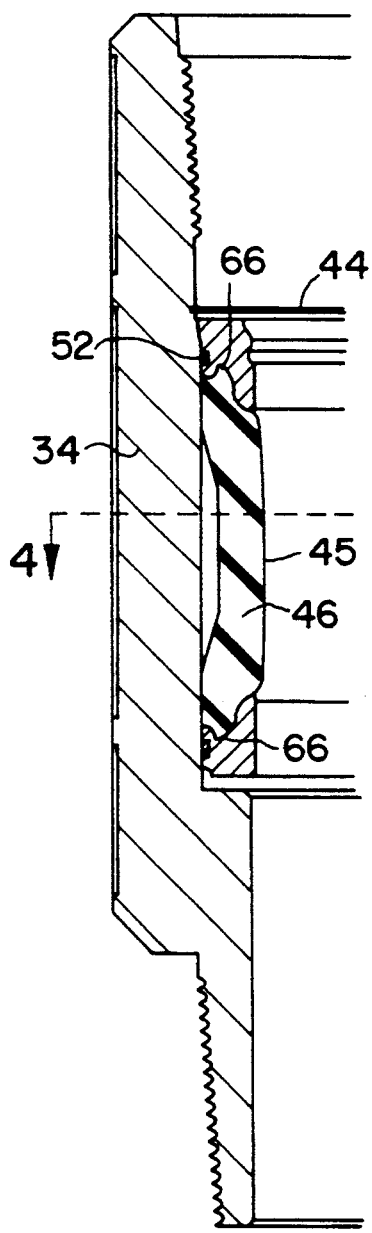
FIG. 5A is a longitudinal cross-sectional view of a portion of the entire safety sub of an alternate embodiment including an elastomeric cartridge having an hour-glass shaped central bore.
Figure 6:
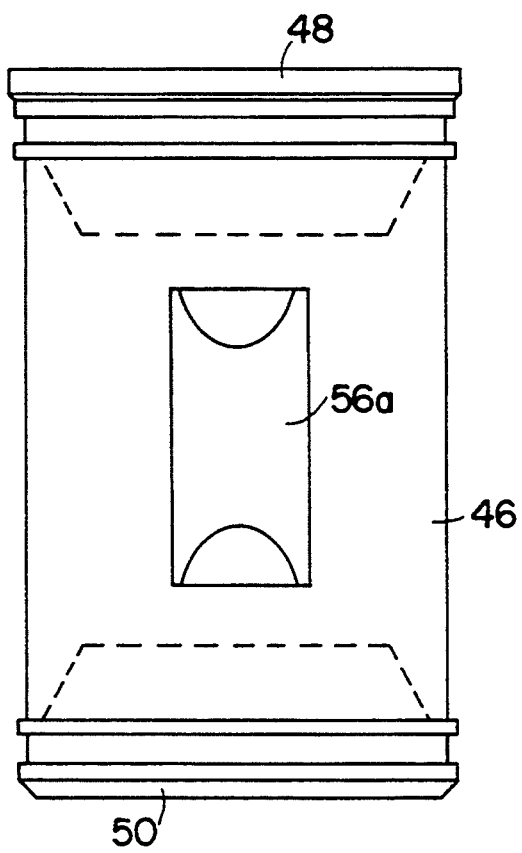
FIG. 6 is a side view of a preferred embodiment of the elastomeric cartridge portion of the safety sub shown in FIG. 3, disclosing the shape of the metallic end inserts and the elastomeric closure.

Now referring to FIGS. 4, 5 and 6, more details of the elastomeric cartridge are shown. First, with respect to FIG. 4, it can be seen that rods 62a, 62b and 62c are parallel to axis 64 and are spaced evenly around the cartridge so as to be located intermediate depressions 56a, 56b and 56c. They are also at a common radial distance from axis 64 to permit the elastomeric material to uniformly surround and bond to the rods during the molding process. It will be seen from FIG. 4 that the wall thickness of closure section 36 is considerably thicker in the areas supported by the rods than where the depressions are located. Thus, when the internal pressure is reduced sufficiently to allow the pre-charge external pressure to close or collapse the elastomeric material, three internal cusps are formed, one opposite each external depression. When closure is complete, the sealing buckling or bends at their most extreme are only 120°.

Turning to FIG. 5, it will be seen that the ends of central closure 46 are cupped in a tapered conical fashion to receive the frustoconical ends of metallic end pieces 48 and 50. The taper angle is most conveniently at a catenary angle because, as with the rods previously discussed, the elastomeric material bonds to the metallic end inserts during the molding process. The catenary angle minimizes the amount of stress in the elastomeric material with respect to the bond of the elastomeric material to the metallic pieces as it flexes during closing and opening.

A preferred embodiment of the cartridge is shown in FIG. 6, where it can be seen that in addition to being a tapered conical surface, the insertion end of the metallic inserts includes an interlocking shape 66 to maximize the bonding.

Figure 7:
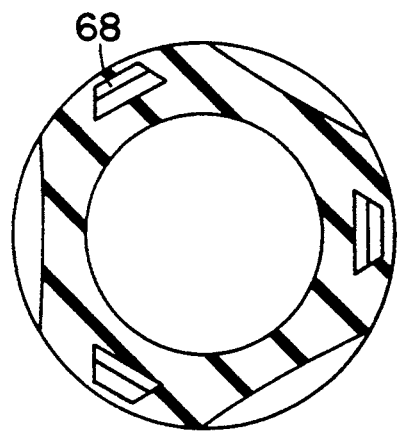
FIG. 7 is a cross-sectional view of an alternate embodiment of an elastomeric cartridge in accordance with the present invention.

It has been determined that the best shape for connecting rods 62a, 62b and 62c is round to minimize the stresses in the elastomeric material that bonds to them. However, alternate rod shapes can be used, such as trapezoidal rods 68 shown in the alternate cartridge elastomeric closure appearing in FIG. 7. When rods such as these that are elongated in cross section are used, the long sides thereof are aligned to be parallel to the radially closest tangents of the central bore opening of the closure structure since alignment of this nature permits proper flexing of the elastomer during closing and opening operations. The rods themselves can be either metallic or plastic and can also be somewhat flexible, as desired.

The elastomeric material performs the entire closing and opening operation by its elastomeric properties alone and without movement of an end to the cartridge. In order to operate in such fashion, the material that is employed possesses high elongation properties, has high tensile strength with the ability to rapidly dissipate energy, is highly resistant to flexure fatigue, and has a sufficiently high modulus to provide dimensional stability to the structure. Generally, a material that has been found having these qualities and is acceptable for the purpose described is a nitrile rubber. Other important characteristics that are desirable for the elastomeric material include resistance to oil and water contamination or degradation and to the other ingredients found in drilling fluids and retention of its desirable mechanical properties set forth above over a broad range of operating temperatures. An elastomer for the application described herein is characterized more specifically by these properties: hardness in Shore A units, 60-90; modulus, 1100-2700 si; ultimate elongation, 300-700%; and tensile set, 5-13%.

The central bore of the elastomeric cartridge can be cylindrical. However, it has been found that there is an advantage to the internal bore 45 being slightly hourglass shaped as shown in FIG. 5A to minimize the stresses in the rubber as the cusps flex to and from their respective closed positions.

In operation, when the internal pressure in the central bore of the elastomeric closure reduces to an amount that allows the pre-charge external pressure to act, cusps are formed opposite each depression. These cusps merge together upon complete closing. More specifically from the beginning, when a depressurized safety sub is charged with the precharge pressure, the elastomer elongates primarily at each of the cusps. This elongation continues in a three-lobed pattern until the central bore opening is sealed off. The elastomeric rods can be somewhat flexible to make this easier, but are generally stable and remain supportive of the ends to prevent the ends from longitudinal movement.

Although three depressions and their corresponding cusps have been described, more than three depressions can be molded into the elastomeric material, if desired.

It should be noted that by depressurizing the safety sub, the elastomeric material of central closure 46 relaxes and provides a fully opened bore therethrough for accommodating a survey tool or the like.

While several embodiments of the invention have been described, it will be understood that the invention is not limited thereto, since many modifications in addition to those specifically discussed may be made and will become apparent to those skilled in the art. For example, multiple longitudinal grooves can be molded in either the internal or external surface or both of molded central closure section 46 of the elastomeric cartridge to assist closure and sealing control and efficiency and to reduce the amount of closure force required for operation.

What is claimed is:

1. A safety sub for retaining drilling fluid in the external fluid supply above a drill string in the event of reduction or loss in operating fluid pressure in the drill string, comprising
    an elastomeric cartridge having a longitudinal axis, including
        a molded elastomeric central closure and
        two metallic end pieces longitudinally fixedly connected to the respective ends of said molded closure,
        said elastomeric cartridge having a central bore sized consistently in internal diameter with the size of the internal bore of the drill string,
    a receiving drill stem sub connectable at its upper end to the external fluid supply and at its lower end to the pressurized drill string,
        said drill stem sub having an internal central bore sized consistently with the size of the internal bore of the drill string, the drill stem sub central bore including an enlarged portion suitable for receiving in a fixed location therein said elastomeric cartridge,
    said elastomeric closure having multiple external side depressions in communication with each other for receiving a pneumatic pre-charge to exert radial closing pressure on said central closure at multiple locations, and
    a charge valve in the side of said drill stem sub for pneumatically pre-charging said elastomeric cartridge at a level less than the operating fluid pressure in the drill string so that normal operating fluid pressure maintains open the central bore of said elastomeric cartridge and fluid pressure less than normal operating fluid pressure results in the pneumatic pre-charge closing said elastomeric cartridge to prevent further drill fluid flow from the external fluid supply until normal operating fluid pressure is restored in the drill string.

2. A safety sub in accordance with claim 1, and including multiple rods parallel with the longitudinal axis of said elastomeric cartridge at least loosely connectable to said respective metallic end pieces.

3. A safety sub in accordance with claim 2, wherein said elastomeric closure grippingly bonds to said rods and to said metallic end pieces.

4. A safety sub in accordance with claim 2, wherein said rods are flexible.

5. A safety sub in accordance with claim 2, wherein said multiple rods are round in cross section.

6. A safety sub in accordance with claim 2, wherein said multiple rods are elongated in cross section with the long sides of the elongated cross section being respectively parallel with the respective radially closest tangents of the central bore of said elastomeric cartridge.

7. A safety sub in accordance with claim 6, wherein said multiple rods are trapezoidal.

8. A safety sub in accordance with claim 1, wherein said charge valve in the side of said drill stem sub is located opposite one of said side depressions in said elastomeric closure.

9. A safety sub in accordance with claim 1, wherein said elastomeric closure includes three circumferentially evenly spaced external side depressions.

10. A safety sub in accordance with claim 1, wherein the internal central bore of said elastomeric closure opposite each of said external side depressions forms a cusp sealingly merging with the other cusps when said elastomeric cartridge closes.

11. A safety sub in accordance with claim 1, and including sealing means between each of said metallic end pieces and the enlarged portion of the internal central bore of said drill stem sub for retaining the pneumatic pre-charge from discharging.

12. A safety sub in accordance with claim 1, and including a retainer means for longitudinally retaining said elastomeric cartridge within said drill stem sub.

13. A safety sub in accordance with claim 1, wherein the central bore of said elastomeric cartridge is cylindrical.

14. A safety sub in accordance with claim 1, wherein the central bore of said elastomeric cartridge is hourglass shaped.

15. A safety sub in accordance with claim 1, wherein the ends of said elastomeric closure and the ends of said two metallic end pieces connected to said elastometric closure are respectively mattingly conically tapered.

16. A safety sub in accordance with claim 15, wherein the respective conically tapered ends of said elastomeric closure and said metallic pieces include interlocking grooves.

17. A safety sub in accordance with claim 1, wherein said elastomeric closure is made of material having high elongation properties, high tensile strength, and is dimensionally stable and flexure fatique resistant.

18. A safety sub in accordance with claim 17, wherein said elastomeric closure is made of material having an elongation capability of 300–700%, a tensile set of 5–13% and a modulus of 1100–2700 psi.

19. An elastomeric cartridge subassembly for insertion into an enlarged bore portion of a receiving drill stem sub to form a safety sub for retaining drilling fluid in the external fluid supply above a drill string in the event of reduction or loss in operating fluid pressure in the drill string, said elastomeric cartridge comprising
    a molded elastomeric central closure having a central bore sized approximately equal in internal diameter with the size of the internal bore of the drill string,
    two metallic end pieces longitudinally fixedly connected to the respective ends of said molded closure, and
    multiple rods parallel with the longitudinal axis of said elastomeric cartridge subassembly at least loosely connectable to said respective metallic end pieces.

20. An elastomeric cartridge subassembly in accordance with claim 19, wherein said elastomeric closure grippingly bonds to said rods and to said metallic end pieces.

21. An elastomeric cartridge subassembly in accordance with claim 19, wherein said rods are flexible.

22. An elastomeric cartridge subassembly in accordance with claim 19, wherein said multiple rods are round in cross section.

23. An elastomeric cartridge subassembly in accordance with claim 19, wherein said elastomeric closure includes three circumferentially evenly spaced external side depressions.

24. An elastomeric cartridge subassembly in accordance with claim 23, wherein the internal central bore of said elastomeric closure opposite each of said external side depressions forms a cusp sealingly merging with the other cusps when said elastomeric cartridge closes.

25. An elastomeric cartridge subassembly in accordance with claim 19, wherein the ends of said elastomeric closure and the ends of said two metallic end pieces connected to said elastomeric closure are respectively mattingly conically tapered.

26. An elastomeric cartridge subassembly in accordance with claim 25, wherein the respective conically tapered ends of said elastomeric closure and said metallic end pieces include interlocking grooves.

* * * * *